United States Patent [19]
Aihara

[11] Patent Number: 6,064,442
[45] Date of Patent: May 16, 2000

[54] COLOR VIDEO SIGNAL DEMODULATING APPARATUS

[75] Inventor: Tsuneo Aihara, Shizuoka, Japan

[73] Assignee: Pioneer Electronic Corporation, Tokyo, Japan

[21] Appl. No.: 09/120,114

[22] Filed: Jul. 22, 1998

[30] Foreign Application Priority Data

Jul. 25, 1997 [JP] Japan ................................ 9-199920

[51] Int. Cl.$^7$ .................................................. H04N 9/455
[52] U.S. Cl. ...................... 348/507; 348/536; 348/638; 348/647
[58] Field of Search .................................. 348/505, 506, 348/507, 536, 638, 647; H04N 9/455, 9/66

[56] References Cited

U.S. PATENT DOCUMENTS 4,577,216  3/1986  Ryan ........................................ 348/506
5,459,524  10/1995  Cooper ..................................... 348/507

*Primary Examiner*—Sherrie Hsia
*Attorney, Agent, or Firm*—Morgan, Lewis & Bockius LLP

[57] ABSTRACT

A color video signal demodulating apparatus is provided. The apparatus includes a color subcarrier signal generator for generating a color subcarrier signal synchronously with a color burst, an abnormal burst detector for detecting an abnormal color burst included in a color video signal, such as a signal for the DVD, and a color subcarrier signal generation controller for controlling the color subcarrier signal generator such that no color subcarrier signal corresponding to the abnormal color burst is generated in response.

16 Claims, 3 Drawing Sheets

COLOR VIDEO SIGNAL DEMODULATING APPARATUS

This application claims the benefit of Japanese Application No. 09-199920, filed in Japan on Jul. 25, 1998, which is hereby incorporated by reference.

BACKGROUND OF THE INVENTION

1. Field of the Invention

The present invention relates to a color video signal demodulating apparatus for demodulating a color video signal in which an abnormal color burst having a phase different from that of a regular color burst is inserted in a predetermined horizontal scanning period, as in a color video signal in which a macro vision signal is recorded for copy guard, for use in DVDs or the like.

2. Discussion of the Related Art

In the DVD or the like, a macro vision signal is recorded for copy guard. The signal is a pseudo horizontal synchronizing signal added to 1 H of the Vertical Blanking Interval (VBI).

In some cases, the color burst is subjected to phase inversion. For example, although a color burst of eight waves of 3.58 MHZ is usually inserted in a back porch, an abnormal color burst is inserted such that 5.5 waves of the former half have the same phase and 5.5 waves of the latter half have an opposite phase. Such a color burst exists in a predetermined horizontal scanning section (H). For example, color bursts of 2 H repeated every 17 H or 4 H repeated every 22 H are such inversion bursts. This inverted color burst is described in U.S. Pat. No. 4,577,216. (However, the inversion burst position and 5.5 waves are not mentioned therein.)

If such a video signal is to be recorded or reproduced by a video tape recorder (VTR), the pseudo horizontal synchronous signal causes an automatic gain control (AGC) circuit to malfunction when the AGC is performed at the VTR recording portion. Furthermore, the inversion color burst causes a color signal crosstalk improvement circuit to malfunction, which is provided at the VTR color signal recording/reproducing portion for suppressing color signal crosstalk between neighboring tracks (color signal crosstalk between fields). With these circuits in the VTR being malfunctioned, the reproduced image quality deteriorates to a level not acceptable to practical use, thereby achieving the function of "copy protection." As a result, normal recording becomes impossible.

In particular, in reproduction of a video picture recorded by the inversion burst, stripes of certain color are displayed on a screen. However, when such a video signal is demodulated by an ordinary NTSC color TV receiver, the signal is properly demodulated and displayed.

The video signal thus provided with the macro vision signal for copy guard of the DVD or the like causes no deterioration of the picture quality when it is demodulated by the NTSC color TV receiver. Therefore, no particular measure has been taken on the receiver side for modulating the macro vision signal.

In the case of the inversion burst, although the picture quality is deteriorated due to differences in hue and color saturation between the inversion burst line and the normal burst line, in general, such deterioration of the picture quality can hardly be noticed by viewers. Thus, no subjective deterioration of the picture quality occurs.

However, when the picture source is changed, for example, the DVD and TV broadcasting are interchanged, the viewers can see a difference between the displayed pictures, i.e., the deterioration of the picture quality is readily recognized under objective evaluation.

SUMMARY OF THE INVENTION

Accordingly, the present invention is directed to a color video signal demodulating apparatus that substantially obviates the problems due to limitations and disadvantages of the related art.

An object of the present invention is to provide a color video signal demodulating apparatus capable of demodulating the DVD signal in which the macro vision copy guard signal including inversion bursts is recorded without sacrificing the picture quality.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a color video signal demodulation apparatus for demodulating a color video signal in which an abnormal color burst having a phase different from the phase of a color burst is inserted in a predetermined horizontal scanning section, the color video signal demodulation apparatus including color subcarrier signal generating means for generating a color subcarrier signal synchronously with the color burst; abnormal burst detecting means for detecting the abnormal color burst; and color subcarrier signal generation control means for controlling the color subcarrier signal generating means such that no color subcarrier signal due to the abnormal color burst detected by the color burst detecting means is generated.

According to the present invention, when the abnormal color burst detecting means detects an abnormal color burst, the color subcarrier signal generation control means suppresses the color subcarrier signal that would be generated by the color subcarrier signal generating means in response to the abnormal color burst.

The color subcarrier signal generating means may include an APC circuit, and the color subcarrier signal generation control means control the color subcarrier signal generating means to stop a phase comparing operation in the APC circuit when the abnormal color burst is detected. In this case generation of the color subcarrier signal due to the abnormal color burst can effectively be suppressed.

The APC circuit may have such a response characteristic that the phase of a generated color subcarrier signal is not deviated by the termination of the phase comparing operation initiated by detection of the abnormal color burst. In this case, since the APC circuit has such a response characteristic that the phase of the color subcarrier signal is not deviated by the termination of the phase comparing operation, generation of the color subcarrier signal corresponding to normal color bursts is continued.

The abnormal color burst detecting means may include a horizontal scanning section detecting means for detecting a horizontal scanning section in which the abnormal color burst is inserted. In this case, when the color video signal scans the horizontal scanning section that is detected by the horizontal scanning section detecting means, the color subcarrier signal generation control means controls the color subcarrier signal generating means such that no color subcarrier signal due to the abnormal color burst is generated. In this case, generation of the color subcarrier signal due to the abnormal color burst can also be suppressed.

The color subcarrier signal generation control means may perform control such that no abnormal color burst detected by the abnormal color burst detecting means is supplied to the color subcarrier signal generating means. In this case, generation of the color subcarrier signal due to the abnormal color burst can effectively be suppressed.

Thus, according to the present invention, the demodulation can be carried out without deteriorating the picture quality of the color video signal containing the abnormal color burst, such as signals for the DVD, in which the macro vision copy guard signal including inversion bursts is recorded.

In another aspect, the present invention provides a color video signal demodulating apparatus for demodulating a color video signal in which an abnormal color burst having a phase different from the phase of a normal color burst is inserted in a predetermined horizontal scanning section, the color video signal demodulating apparatus including color subcarrier signal generating means for generating a color subcarrier signal in synchronization with the normal color burst; abnormal color burst detecting means for detecting the abnormal color burst; and color subcarrier signal generation control means for controlling said color subcarrier signal generating means such that no color subcarrier signal corresponding to the abnormal color burst is generated from said color subcarrier signal generating means when the abnormal color burst is detected by said abnormal color burst detecting means.

In another aspect, the present invention provides a color video signal demodulating apparatus for demodulating a composite color video signal including a color burst signal in each horizontal scanning section, the color burst signal in each of the horizontal scanning section being either a normal color burst signal or abnormal color burst signal having a phase different from that of the normal color burst signal, the color video signal demodulating apparatus including a color subcarrier signal generator that outputs color subcarrier signals in synchronization with the color burst signals; an abnormal color burst detector that detects the abnormal color burst signals; and a controller communicating with the abnormal color burst detector, the controller regulating the output of the color subcarrier signal generator such that even when the abnormal color burst signal is detected by the abnormal color burst detector, the color subcarrier signal generator outputs the color subcarrier signals substantially corresponding to the normal color burst signal in response thereto.

In a further aspect, the present invention provides a color video signal demodulating apparatus for demodulating a composite color video signal including a color burst signal in each horizontal scanning section, the color burst signal in each of the horizontal scanning section being either a normal color burst signal or abnormal color burst signal having a phase different from that of the normal color burst signal, the color video signal demodulating apparatus including a signal separator that extracts the color burst signals and color signals from the composite video signals; a color subcarrier signal controller that outputs color subcarrier signals in synchronization with the color burst signals, the color subcarrier signal controller outputting the color subcarrier signal substantially corresponding to the normal color burst signal even when detecting the abnormal color burst signal; and a color demodulator that demodulates the color signals in accordance with the color subcarrier signals output from the color subcarrier signal controller.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
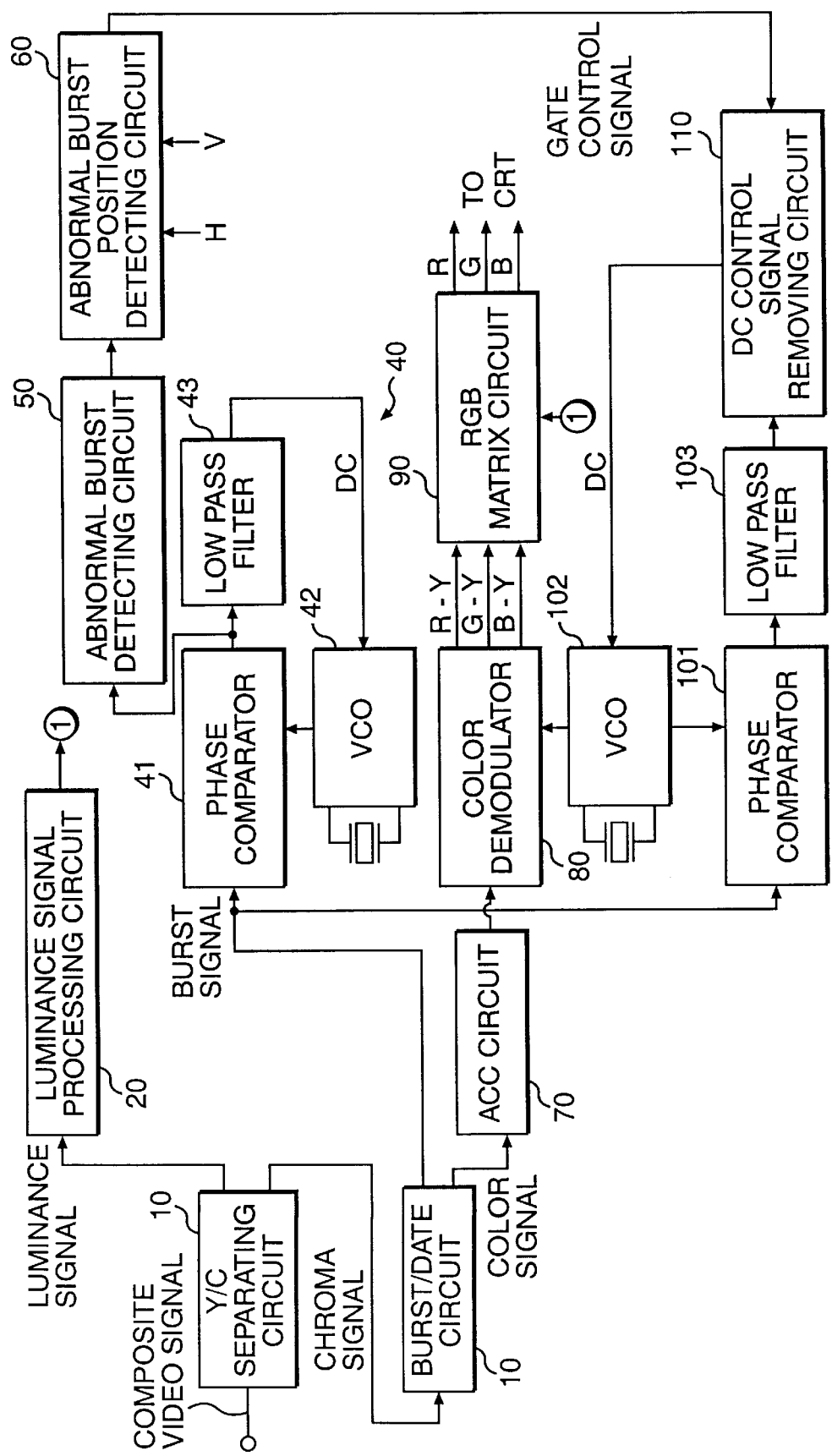
FIG. 1 is a block diagram showing a preferred embodiment of a color video signal demodulating apparatus according to the present invention.

FIG. 1 shows a preferred embodiment of a color video signal demodulating apparatus according to the present invention. Referring to FIG. 1, a Y/C separating circuit 10 separates a composite video signal into a luminance signal and a chroma signal. The separated luminance signal is processed by a luminance signal processing circuit 20 and output to a RGB matrix circuit 90.

A burst/gate circuit 30 is provided for extracting a color burst signal from the chroma signal. The color burst signal is output to a PLL circuit 40 including a phase comparator 41, VCO 42, and low pass filter 43.

When the color burst signal is supplied to the phase comparator 41 together with a signal generated from the VCO 42, the phase comparator 41 compares the phases of these signals and generates a signal corresponding to the phase difference. The thus generated signal is supplied to the VCO 42 through the low pass filter 43 to control the VCO 42 so that the VCO 42 is oscillated with a frequency having the same stability as that of the color burst signal.

An abnormal burst detecting circuit 50 is provided at the output side of the phase comparator 41 to determine whether the color burst input to the phase comparator 41 is abnormal or normal. Because the output of the phase comparator 41 depends on whether the color burst is input to the phase comparator 41 with the same phase or with a different phase (for example an opposite phase), it is possible to detect the abnormal burst.

More specifically, the abnormal burst detecting circuit 50 is provided with a reference voltage corresponding to the average DC voltage of the output of the phase comparator 41 in the case of the same phase color burst and a reference voltage corresponding to the same in the case of the opposite phase color burst. By comparing a DC voltage obtained by smoothing the output of the phase comparator 41 with each of the reference voltages, it is possible to determine whether the color burst input to the PLL circuit 40 is normal or inverted (abnormal).

An abnormal burst position detecting circuit 60 detects in which line the abnormal color burst is inserted in a single field or single frame in accordance with a horizontal synchronizing pulse (H), vertical synchronizing pulse (V), and the detection signal from the abnormal burst detecting circuit 50.

More specifically, the abnormal burst position detecting circuit 60 may include a counter and a memory, which can be reset by the vertical synchronizing pulse (V). The counter carries out counting each time the horizontal synchronizing pulse (H) is input. Each time an abnormal burst determination signal is input from the abnormal burst detecting circuit 50, a count value of the counter at that time is stored in the memory to determine in which line the abnormal color burst is inserted.

An ACC circuit 70 controls the color level of the color signal from the burst/gate circuit 30. The signal whose level has been controlled by the ACC circuit is demodulated by a color demodulator 80 and then output to a CRT through an RGB matrix circuit 90 to which Y signal (luminance signal) is input from the luminance signal processing circuit 20.

An APC circuit 100 includes a phase comparator 101, VCO 102, and low pass filter 103, and generates color subcarrier signals for use in demodulating color signal in the color demodulator 80. In other words, the APC circuit 100 detects a phase difference between the color burst and an output of the 3.58 MHZ oscillator to control the phase of the 3.58 MHZ oscillator, thereby always securing synchronization of a reference subcarrier with the color burst. When the color burst and a signal generated in the VCO 102 are supplied to the phase comparator 101, the phase comparator 101 compares the phases of these signals and produces a signal corresponding to the phase difference. The resultant signal is supplied to the VCO 102 through the low pass filter 103 so that VCO 102 is oscillated with a frequency having the same stability as the color burst.

A DC control signal removing circuit 110 is provided between the low pass filter 103 and VCO 102 with its ON/OFF being controlled by a gate control signal which is a detection signal output from the abnormal burst position detecting circuit 60. This circuit 110 may include a gate circuit and/or a mute circuit.

As described above, in the macro vision signal, the position of the line of the inversion burst is predetermined. Thus, once a position of an abnormal color burst is detected by the abnormal burst position detecting circuit 60, the position of the abnormal color burst in the field (or frame) following that field (or frame) can be detected by resetting the counter in response to the vertical synchronous pulse (V) input to the abnormal burst position detecting circuit 60 and by carrying out counting of the horizontal synchronizing pulse (H).

When the position of the line of this abnormal color burst is reached, the abnormal burst position detecting circuit 60 outputs the gate control signal. As a result, the DC control signal removing circuit 110 is turned off so that the output from the low pass filter 103 to the VCO 102 is shut off. As a result, generation of the 3.58 MHZ color subcarrier from the APC circuit 100 due to the abnormal color burst is stopped.

Since the abnormal color burst is input to the APC circuit 100 over subsequent two lines or four lines, for example, phase comparing operation is not performed for those lines. The APC circuit 100 is adapted to have such a response characteristic that the phase of the color subcarrier generated from the VCO 102 does not deviate from that of normal color bursts (maintaining the same phase) even if the phase comparing operation is stopped.

Next, the operation of the color video signal demodulating apparatus having the above configuration will be described in more detail. First, when the color burst extracted at the burst gate circuit 30 is input to the phase comparator 41 of the PLL circuit 40, the phase comparator 41 compares the phase of the color burst with that of a signal generated from the VCO 42. Then, by supplying a signal corresponding to the detected phase difference to the VCO 42 through the low pass filter 43, the signal from the VCO 42 oscillates with a frequency having the same stability as the color burst. The output of the phase comparator 41 is input to the abnormal burst detecting circuit 50 to determine whether the color burst is normal.

As described above, the abnormal burst detecting circuit 50 is provided with the reference voltage corresponding to the average DC voltage of the phase comparator 41 in the case of same phase color bursts and the reference voltage in the case of the opposite phase color bursts. By comparing the DC voltage obtained by smoothing the output of the phase comparator 41 with each of the reference voltages, it is possible to determine whether the color burst input to the PLL circuit 40 is normal or inverted (abnormal).

If the abnormal burst detecting circuit 50 outputs a detection signal to the abnormal burst position detecting circuit 60, the abnormal burst position detecting circuit 60 detects in which line the abnormal color burst is inserted in a single field or single frame in accordance with the detection signal, horizontal synchronizing pulse (H), and the vertical synchronizing pulse (V).

In order to detect the line in which the abnormal color burst is inserted, a counter and a memory, which are reset by the vertical synchronizing pulse (V), are provided. Each time the horizontal synchronizing pulse (H) is input, the counter carries out counting, and each time the abnormal burst signal is input from the abnormal burst detecting circuit 50, the current count value of the counter at that time is stored in the memory to determine in which line the abnormal color burst is inserted.

A detection signal output from the abnormal burst position detecting circuit 60 is input to the DC control signal removing circuit 110 as a gate control signal.

On the other hand, the color signal from the burst/gate circuit 30 is demodulated by the color demodulator 80 after its color level is controlled by the ACC circuit 70. The demodulated color signal is then output to the CRT side through the RGB matrix circuit 90 to which Y signal (luminance signal) is input from the luminance signal processing circuit 20.

At that time, the color subcarrier for use in demodulating the color signal is input to the color demodulator 80 from the VCO 102 of the APC circuit 100. As described above, in the APC circuit 100, the color burst and the signal generated by the VCO 102 are supplied to the phase comparator 101. Then, the phase comparator 101 compares the phases of these signals and produces a signal corresponding to the phase difference. This signal is supplied to the VCO 102 through the low pass filter 103 so that oscillation frequency of the signal from the VCO 102 is maintained with the same stability as the color burst.

When the position of the abnormal color burst is detected by the abnormal burst position detecting circuit 60, the DC control signal removing circuit 110 is controlled so as to be opened by the gate control signal from the abnormal burst position detecting circuit 60. In this case, the output from the low pass filter 103 to the VCO 102 in the APC circuit 100 is interrupted. As a result, the color subcarrier of 3.58 MHZ corresponding to the abnormal color burst is not generated from the APC circuit 100. Thus, the signal demodulated by the color demodulator 80 is a clear signal with no deterioration of the picture quality.

As described above, the APC circuit 100 is adapted to have such a response characteristic that the phase of the color subcarrier generated from the VCO 102 does not deviate from that of normal color burst (maintaining the same phase) even if the gate control signal due to detection of the abnormal color burst is input to the APC circuit 100 over subsequent two lines or four lines and the phase comparing action is accordingly stopped. Thus, the demodulation in the color demodulator 80 is stably carried out.

According to the embodiment of the present invention, if any abnormal color burst is detected by the abnormal burst detecting circuit 50, which functions as an abnormal color burst detecting means, the abnormal burst position detecting circuit 60 and the DC control signal removing circuit 110, which together function as the color subcarrier signal generation control means, suppress generation of the color subcarrier signal corresponding to the abnormal color burst from the APC circuit 100, which functions as the color subcarrier signal generating means. Thus, it becomes possible to demodulate the DVD signal, in which the macro vision copy guard signal including inversion bursts is recorded, without any deterioration of the picture quality.

In the above preferred embodiment, the counter in the abnormal burst position detecting circuit 60 carries out counting each time the horizontal synchronizing pulse is input and the count value of the counter is stored in the memory each time the abnormal burst determination signal is input from the abnormal burst detecting circuit 50 in order to detect in which line the abnormal color burst is inserted. However, the present invention is not limited to this example. For example, the gate control signal may be output at a predetermined timing which is determined by data relating to the position of the abnormal color burst stored in the memory. In this case, the aforementioned line position determining operation may be carried out continuously for each single field or single frame (or every several fields or every several frames), and the line of the abnormal color burst output as a result may be stored in the memory so that a content of the memory can be updated in succession.

As a result, even if the line inserted with the abnormal color burst differs disk by disk or the abnormal color bursts exist at any arbitrary positions in a disk, it is possible to suppress generation of the subcarrier that would be generated in response to the abnormal color burst by the APC circuit 100.

Figure 2:
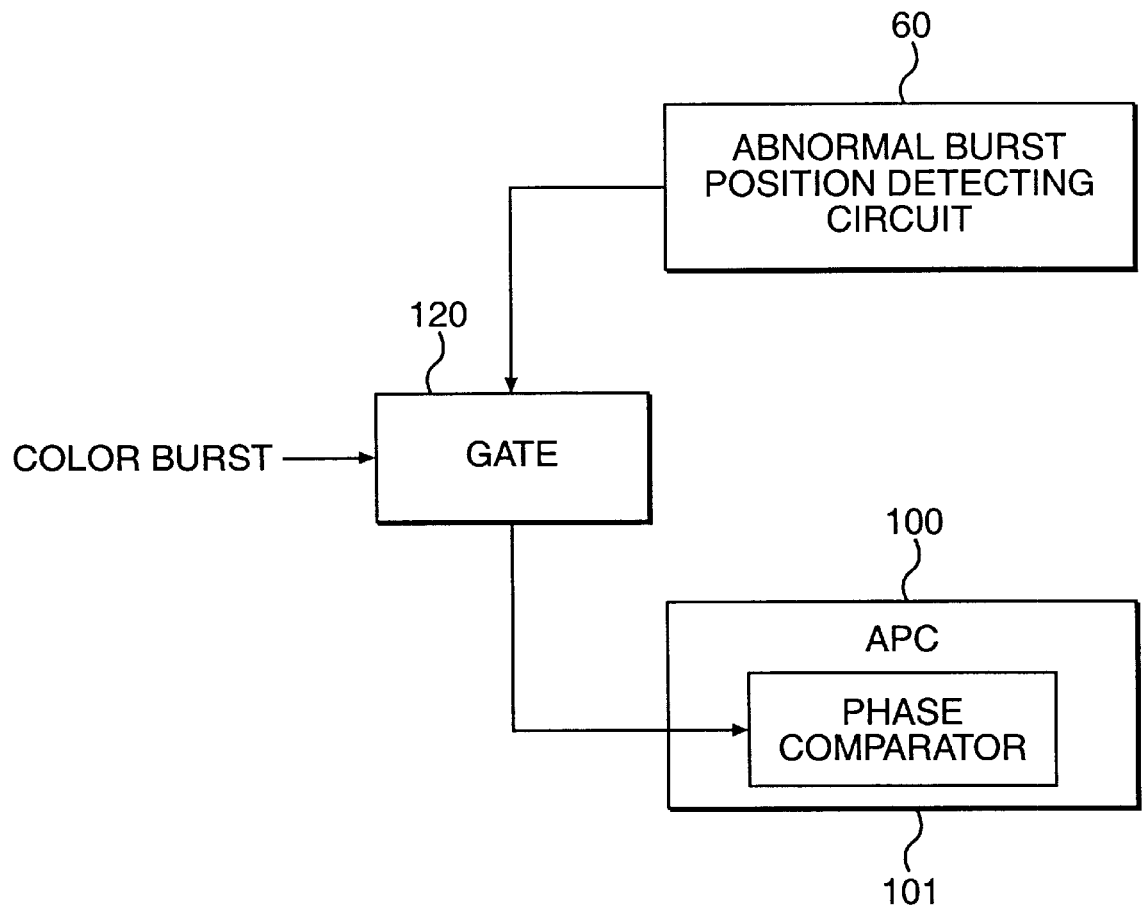
FIG. 2 is a block diagram showing another preferred embodiment of the color video signal demodulating apparatus according to the present invention, which is a modification of the apparatus of FIG. 1.

In another embodiment, a gate circuit 120 may be provided between the burst/gate circuit 30 and the phase comparator 101 of the APC circuit 100, as shown in FIG. 2. In this case, by controlling the gate circuit 120 by the detection signal from the abnormal burst position detecting circuit 60, the color burst (abnormal color burst at that time) is not input to the phase comparator 101 of the APC circuit 100 when the position of the abnormal color burst is detected.

Further, the color signal from the ACC circuit 70 to be input to the color demodulator 80 and the color burst to be input to the APC circuit 100 may be made to differ from each other by 1 H. In this case, it is possible to omit the abnormal burst position detecting circuit 60 while preventing generation of the subcarrier due to the abnormal color burst in the APC circuit 100 even for video signals in which the abnormal color bursts are inserted at random positions.

Furthermore, it is possible to allow the user to select activation of the above-mentioned functions by using a device, such as a manual switch. Thus, if desired, users can turn off selected functions, such as detection of the abnormal burst by means of the abnormal burst detecting circuit 50, detection of the abnormal burst position by means of the abnormal burst position detecting circuit 60, and operation to stop outputting the color subcarrier of 3.58 MHZ due to the abnormal color burst from the APC circuit 100 by the DC control signal removing circuit 110 or the like.

In the above embodiments, the DVD signal recorded with the macro vision signal including inversion bursts is demodulated without any deterioration of the picture quality. However, the present invention is not limited to this example, but can be applied to demodulation of any color video signal, in which an abnormal burst of similar kind is inserted besides the macro vision signal.

Figure 3:
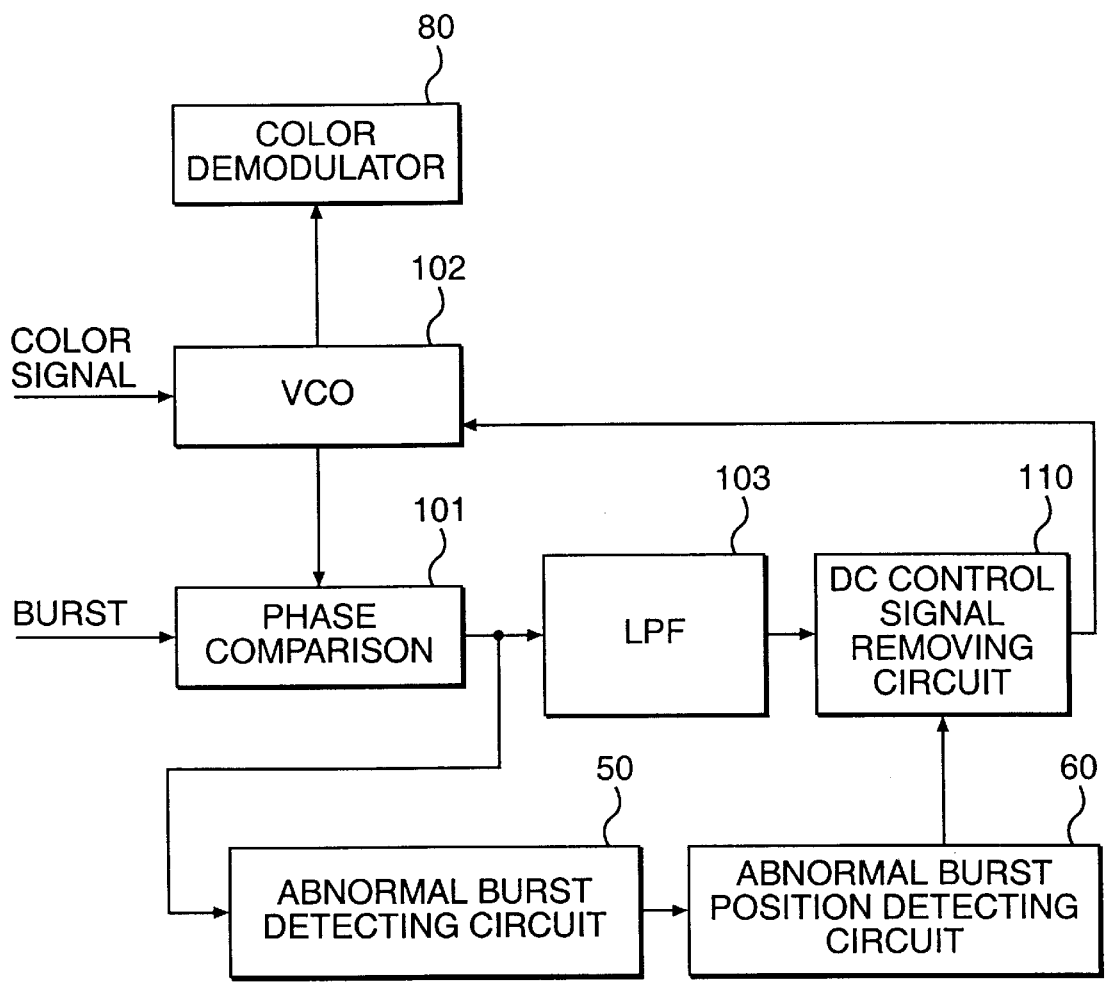
FIG. 3 is a block diagram showing still another preferred embodiment of the color video signal demodulating apparatus according to the present invention, which is another modification of the apparatus of FIG. 1.

Further, as shown in FIG. 3, the PLL circuit 40 and the APC circuit 100 may be formed into one circuit. In this case, the circuit configuration may be simplified.

It will be apparent to those skilled in the art that various modifications and variations can be made in the color video signal demodulating apparatus of the present invention without departing from the spirit or scope of the invention. Thus, it is intended that the present invention cover the modifications and variations of this invention provided they come within the scope of the appended claims and their equivalents.

What is claimed is:

1. A color video signal demodulating apparatus for demodulating a color video signal in which an abnormal color burst having a phase different from the phase of a normal color burst is inserted in a predetermined horizontal scanning section, the color video signal demodulating apparatus comprising:

a color subcarrier signal generator for generating a color subcarrier signal in synchronization with the normal color burst;

an abnormal color burst detector for detecting the abnormal color burst; and a color subcarrier signal generation controller for controlling said color subcarrier signal generator such that no color subcarrier signal corresponding to the abnormal color burst is generated from said color subcarrier signal generator when the abnormal color burst is detected by said abnormal color burst detector.

2. The color video signal demodulating apparatus according to claim 1, wherein said color subcarrier signal generator includes an APC circuit for carrying out a phase comparing operation, and said color subcarrier signal generation controller controls said color subcarrier signal generator to stop the phase comparing operation in the APC circuit when the abnormal color burst is detected by said abnormal color burst detector.

3. The color video signal demodulating apparatus according to claim 2, wherein the APC circuit has a response characteristic such that the phase of the color subcarrier signal is unaffected by the stop of the phase comparing operation in the APC circuit in response to the detection of the abnormal color burst.

4. The color video signal demodulating apparatus according to claim 1, wherein said abnormal color burst detector includes horizontal scanning section detector for detecting a horizontal scanning section that includes the abnormal color burst, and wherein when the horizontal scanning section detected by said horizontal scanning section detector is scanned, said color subcarrier signal generation controller controls said color subcarrier signal generator such that no color subcarrier signal corresponding to the abnormal color burst is generated.

5. The color video signal demodulating apparatus according to claim 1, wherein said color subcarrier signal generation controller interrupts the output of the abnormal color burst to said color subcarrier signal generator when the abnormal color burst is detected by said abnormal color burst detector.

6. A color video signal demodulating apparatus for demodulating a composite color video signal including a color burst signal in each horizontal scanning section, the color burst signal in each of the horizontal scanning section being either a normal color burst signal or abnormal color burst signal having a phase different from that of the normal color burst signal, the color video signal demodulating apparatus comprising:

a color subcarrier signal generator that outputs color subcarrier signals in synchronization with the color burst signals;

an abnormal color burst detector that detects the abnormal color burst signals; and a controller communicating with the abnormal color burst detector, the controller regulating the output of the color subcarrier signal generator such that even when the abnormal color burst signal is detected by the abnormal color burst detector, the color subcarrier signal generator outputs the color subcarrier signals substantially corresponding to the normal color burst signal in response thereto.

7. The color video signal demodulating apparatus according to claim 6, wherein the color subcarrier signal generator includes an APC circuit for carrying out a phase comparing operation comparing a phase of the burst signals with a phase of an oscillator, and the controller controls the color subcarrier signal generator to stop the phase comparing operation in the APC circuit when the abnormal color burst signal is detected by the abnormal color burst detector.

8. The color video signal demodulating apparatus according to claim 7, wherein the APC circuit has a response characteristic such that the phase of the color subcarrier signal is unaffected by the stop of the phase comparing operation in the APC circuit in response to the detection of the abnormal color burst signal.

9. The color video signal demodulating apparatus according to claim 6, wherein the abnormal color burst detector includes a horizontal scanning section detector for detecting a horizontal scanning section that includes the abnormal color burst signal, and wherein when the horizontal scanning section including the abnormal color burst signal is detected by the horizontal scanning section detector, the controller controls the color subcarrier signal generator to output the color subcarrier signal substantially corresponding to the normal color burst signal in response thereto.

10. The color video signal demodulating apparatus according to claim 6, wherein the controller interrupts the output of the abnormal color burst signal to the color subcarrier signal generator when the abnormal color burst signal is detected by the abnormal color burst detector.

11. The color video signal demodulating apparatus according to claim 6, wherein the abnormal color burst detector includes a memory for storing positions of the abnormal color burst signals, and wherein the controller controls the color subcarrier signal generator in accordance with the stored positions of the abnormal color burst signals.

12. The color video signal demodulating apparatus according to claim 6, further comprising:

a signal separator that extracts the color burst signals and color signals from the composite video signals; and a color demodulator that demodulates the color signals in accordance with the color subcarrier signals output from the color subcarrier signal generator.

13. A color video signal demodulating apparatus for demodulating a composite color video signal including a color burst signal in each horizontal scanning section, the color burst signal in each of the horizontal scanning section being either a normal color burst signal or abnormal color burst signal having a phase different from that of the normal color burst signal, the color video signal demodulating apparatus comprising:

a signal separator that extracts the color burst signals and color signals from the composite video signals;

a color subcarrier signal controller that outputs color subcarrier signals in synchronization with the color burst signals, the color subcarrier signal controller outputting the color subcarrier signal substantially corresponding to the normal color burst signal even when detecting the abnormal color burst signal; and a color demodulator that demodulates the color signals in accordance with the color subcarrier signals output from the color subcarrier signal controller.

14. The color video signal demodulating apparatus according to claim 13, wherein the color subcarrier signal controller includes a circuit for comparing the phase of the color burst signal with a phase of a reference signal to determine whether the color burst signal is normal.

15. The color video signal demodulating apparatus according to claim 13, wherein the color subcarrier signal controller includes a horizontal scanning section detector for detecting a horizontal scanning section that includes the abnormal color burst signal, and wherein when the horizontal scanning section including the abnormal color burst signal is detected by the horizontal scanning section detector, the color subcarrier signal controller outputs the color subcarrier signal substantially corresponding to the normal color burst signal in response thereto.

16. The color video signal demodulating apparatus according to claim 13, wherein the color subcarrier signal controller includes a memory for storing positions of the abnormal color burst signals, and wherein the color subcarrier signal controller outputs the color subcarrier signal in accordance with the stored positions of the abnormal color burst signals.

* * * * *